US012168900B2

(12) United States Patent
Yao et al.

(10) Patent No.: US 12,168,900 B2
(45) Date of Patent: Dec. 17, 2024

(54) FEEDBACK MECHANISM FOR BIOLOGICAL SAFETY CABINET

(71) Applicants: Thermo Fisher Scientific (Shanghai) Instruments Co., Ltd., Shanghai (CN); Thermo Fisher Scientific (Suzhou) Instruments Co., Ltd., Suzhou (CN)

(72) Inventors: Max Yao, Shanghai (CN); Sean Shang, Shanghai (CN); Yi Zhou, Suzhou (CN); Julia Geng, Shanghai (CN)

(73) Assignees: Thermo Fisher Scientific (Shanghai) Instruments Co., Ltd., Shanghai (CN); Thermo Fisher Scientific (Suzhou) Instruments Co., Ltd., Suzhou (CN)

( * ) Notice: Subject to any disclaimer, the term of this patent is extended or adjusted under 35 U.S.C. 154(b) by 276 days.

(21) Appl. No.: 17/675,449

(22) Filed: Feb. 18, 2022

(65) Prior Publication Data

US 2022/0268070 A1 Aug. 25, 2022

(30) Foreign Application Priority Data

Feb. 24, 2021 (CN) ......................... 202110202888.7

(51) Int. Cl.
*E05D 15/16* (2006.01)
*B01L 1/00* (2006.01)
*E05B 65/00* (2006.01)

(52) U.S. Cl.
CPC .............. *E05D 15/165* (2013.01); *B01L 1/00* (2013.01); *E05B 65/0075* (2013.01)

(58) Field of Classification Search
CPC .... E05D 15/165; B01L 1/00; B01L 2200/087; B01L 2200/143; B01L 2300/046; B01L 1/025; E05B 65/0075
See application file for complete search history.

(56) References Cited

U.S. PATENT DOCUMENTS 3,583,101 A * 6/1971 Pudenz ................. E06B 3/4636 160/90
2007/0184769 A1* 8/2007 Lin ......................... B08B 15/02 454/57
2015/0367389 A1* 12/2015 Lee ....................... B08B 15/023 454/59

FOREIGN PATENT DOCUMENTS

CN 205012834 U 2/2016
CN 105939779 A * 9/2016 ........ B01L 3/502715
(Continued)

OTHER PUBLICATIONS

Extended European Search Report from European Application No. 22158595.3, dated Jul. 25, 2022, 10 pages.

*Primary Examiner* — Hanh V Tran
(74) *Attorney, Agent, or Firm* — Klarquist Sparkman LLP

(57) ABSTRACT

The present invention relates to a feedback mechanism for a biological safety cabinet comprising a glass window and a cover plate in front of the glass window, the feedback mechanism comprises a monitor control component comprising a roller element being fixedly disposed with respect to the cover plate and comprising a rollable roller, and a contact component being fixedly disposed relative to the glass window so that the contact component can move relative to the roller with movement of the glass window, the contact component comprising a recess for receiving the roller, wherein the contact component moves with the glass window to a position corresponding to the roller when the glass window moves relative to the cover plate, such that the roller rolls into the recess, allowing the feedback mechanism to generate tactile feedback.

14 Claims, 8 Drawing Sheets

(56) References Cited

FOREIGN PATENT DOCUMENTS

| | | | | | |
|---|---|---|---|---|---|
| CN | 111593995 | A | * | 8/2020 | ......... E05B 47/0012 |
| CN | 212186268 | U | * | 12/2020 | |
| CN | 212304843 | U | * | 1/2021 | |
| CN | 117547316 | A | * | 2/2024 | |
| JP | H0566494 | U | * | 9/1993 | |
| JP | H0566495 | U | * | 9/1993 | |
| JP | 2547622 | Y2 | * | 9/1997 | |
| JP | 2008057265 | A | * | 3/2008 | |
| JP | 2013060698 | A | * | 4/2013 | |
| JP | 5448664 | B2 | * | 3/2014 | |
| JP | 2017089318 | A | * | 5/2017 | ......... E05D 15/0669 |
| JP | 2021018027 | A | * | 2/2021 | |
| KR | 101044803 | B1 | * | 6/2011 | |
| KR | 101398112 | B1 | * | 5/2014 | |
| KR | 20150120648 | A | * | 10/2015 | |
| KR | 101581295 | B1 | * | 1/2016 | |
| KR | 102095775 | B1 | * | 4/2020 | |
| WO | WO-2007139354 | A1 | * | 12/2007 | ......... E05D 15/1013 |
| WO | WO-2019152608 | A1 | * | 8/2019 | .............. F24C 15/00 |
| WO | WO-2022190734 | A1 | * | 9/2022 | ............. F25D 21/14 |

* cited by examiner

FEEDBACK MECHANISM FOR BIOLOGICAL SAFETY CABINET

CROSS-REFERENCE TO RELATED APPLICATION

The present application claims priority under 35 U.S.C. § 119 of Chinese Patent Application No. 202110202888.7, filed Feb. 24, 2021, the disclosure of which is hereby incorporated herein by reference in its entirety.

FIELD OF THE INVENTION

The present invention relates to a positioning device for medical equipment, and more particularly to a feedback mechanism for a biological safety cabinet.

BACKGROUND OF THE INVENTION

In medical tests, some toxic chemical substances are volatile. In order to prevent these polluting gases from leaking and purify them, biological safety cabinets (BSC) are usually used to treat the gases.

The BSC generally comprises a chamber and a big heavy (typically 1.8 meters long and 1.2 meters wide) glass window, which is located on the front of the chamber. The glass window can be manually moved in a predetermined stroke. There is a position which, close to the middle of the stroke, is named as a working position. When the window's lower edge reaches the working position, the BSC works with the best performance.

The issue is when a user wants to move the window to the working position, the window is always moved out of the working position due to its large weight and volume.

According to the YY0569 biological safety cabinet industry standard, the air flow rate and other standards generated by the fan in the BSC are determined based on the working position. Therefore, once the glass window cannot reach the working position accurately and easily, various parameters will not meet the expected standards, which will lead to a decline in working performance and may even cause danger.

Therefore, when the glass window reaches the working position, the user needs accurate feedback to allow the user to accurately and easily move the glass window to the working position.

SUMMARY OF THE INVENTION

The present invention provides a feedback mechanism for a biological safety cabinet comprising a movable glass window and a cover plate located in front of at least a part of the glass window. This feedback mechanism allows the user to accurately and easily move the window to the working position.

In particular, the feedback mechanism comprises a monitor control component comprising a roller element being fixedly disposed with respect to the cover plate and comprising a rollable roller, and a contact component being fixedly disposed relative to the glass window so that the contact component can move relative to the roller with movement of the glass window, the contact component comprising a recess for receiving the roller, wherein the contact component moves with the glass window to a position corresponding to the roller when the glass window moves relative to the cover plate, such that the roller rolls into the recess, allowing the feedback mechanism to generate tactile feedback. The user can determine that the window has reached its working position by the tactile feedback generated by the feedback mechanism.

In one embodiment, the monitor control component further comprises at least a first micro switch and a second micro switch fixedly disposed with respect to the cover plate and configured to contact the contact component when the roller rolls into the recess, thereby generating a first trigger signal and a second trigger signal being used to provide feedback of a position of the roller with respect to the recess.

Further, the first and second micro switches each comprises a movable arm, and the micro switch contacting the contacting component comprises the movable arms of the micro switch being pressed by the contacting component to generate the first trigger signal and the second trigger signal.

In one embodiment, the roller element of the monitor control component is disposed on a side of the cover plate and the contact component is correspondingly disposed on a side of the glass window.

In a further embodiment, the roller element of the monitor control component is disposed on a surface of the cover plate facing the glass window, and the contact component is provided on a surface of the glass window facing the cover plate.

In one embodiment, the monitor control component comprises a frame, and the roller element and the first and second micro switches are fixed on the frame. And the frame can be fixedly disposed relative to the cover plate for convenient installation.

In one embodiment, the first micro switch and second micro switch are located on upper and lower sides of the roller element along the direction of movement of the glass window with respect to the cover plate, such that both of micro switches generate trigger signals that are used as the basis for judging whether the glass window is in the working position when the two micro switches are in contact with the contact component.

In one embodiment, the roller element is a spring-driven roller element, which further comprises a roller bearing portion and a spring disposed in the roller bearing portion. The tension and release of the spring can be used to generate tactile feedback.

Further, the spring-driven roller element further comprises a nut configured to rotatably adjust the spring to change the strength of the tactile feedback to obtain the appropriate feedback force.

In one embodiment, the recess of the contact component is positioned centrally in the middle of the contact component, and wherein the roller element is centrally disposed on the middle portion of the frame.

In an alternative embodiment, the contact component comprises a top surface and a bottom surface opposite to the top surface, the recess being recessed from the top surface to form opposite side inclined surfaces, and each of the side inclined surfaces comprising a first inclined surface close to the top surface and a second inclined surface continuous with the first inclined surface and close to the bottom surface, wherein a first inclination angle of the first inclined surface relative to the bottom surface of the contact component is smaller than the second inclination angle of the second inclined surface relative to the bottom surface of the contact component. Such side inclined surfaces achieve a balance between obvious tactile feedback and easy movement of the glass window from the working position.

In one embodiment, the first inclination angle is greater than or equal to 15° and less than 35°, and the second inclination angle is greater than or equal to 35° and less than 45°.

In an alternative embodiment, an intersection of the first inclined surface and the second inclined surface is approximately at a middle position of the side inclined surface.

Additionally, the contact component further comprises edge inclined surfaces angled with the bottom surface of the contact component along the direction of movement of the contact component, and a third inclination angle of the edge inclined surfaces relative to the bottom surface of the contact component is 10° to 30°.

The present invention also provides a biological cabinet comprising any of the above feedback mechanisms to achieve feedback of the position of the glass window of the biological safety cabinet.

Additional features and advantages of the feedback mechanism described herein will be set forth in the description below and will be apparent to those skilled in the art by the following or will be recognized by those skilled in the art from practicing the embodiments described herein, which description includes the detailed description, claims, and accompanying drawings below.

BRIEF DESCRIPTION OF THE DRAWINGS

With reference to the above objectives, the technical features of the present invention are clearly described in the following claims, and its advantages are apparent from the following detailed description with reference to the accompanying drawings illustrating preferred embodiments of the present invention by way of example without limiting the scope of the present invention concept.

DETAILED DESCRIPTION OF THE INVENTION

Figure 1:
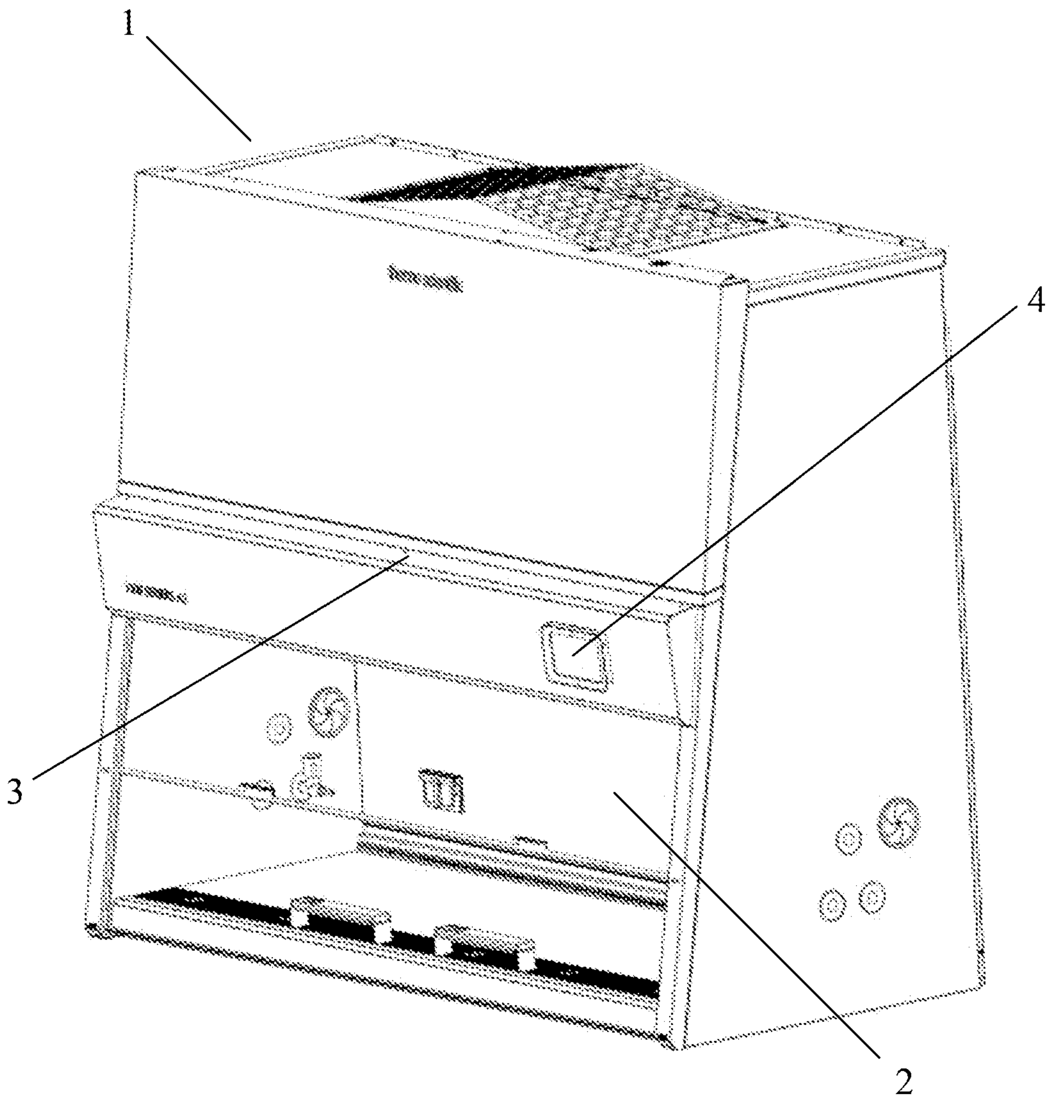
FIG. 1 shows a perspective view of a biological safety cabinet.

The following embodiments of the present invention are described in detail with reference to the accompanying drawings, so as to more clearly understand the purpose, features and advantages of the present invention. It should be understood that the embodiments shown in the drawings are not intended to limit the scope of the present invention, but only to illustrate the essential spirit of the technical solution of the present invention.

Herein, the described direction is defined according to the user's position at work, where "front" refers to the direction in which the user faces the user during work; "upper" refers to the upward direction when the user is working; and "lower" refers to the downward direction when the user is working.

The term "tactile feedback" as used herein refers to the mechanical stimulation of the force transmitted to the user by touching the feedback mechanism or a portion to which the feedback mechanism is attached when the user uses the feedback mechanism of the present invention. Through this mechanical stimulation, the user can know whether the glass window has reached the working position.

The term "digital feedback" as used herein refers to the electronic signal displayed on the human-machine interface due to the triggering of electronic components, herein the triggering of a micro switch when the user uses the feedback mechanism of the present invention. Herein, digital feedback is characterized as a digital signal that displays "1" on the human-machine interface. The user can use this digital signal to determine whether the glass window has reached the working position.

For ease of illustration, in the following description, the same or similar components use the same reference number. It should be understood that "first" and "second" in the description can be interchanged without affecting the description of the embodiments.

Figure 2:
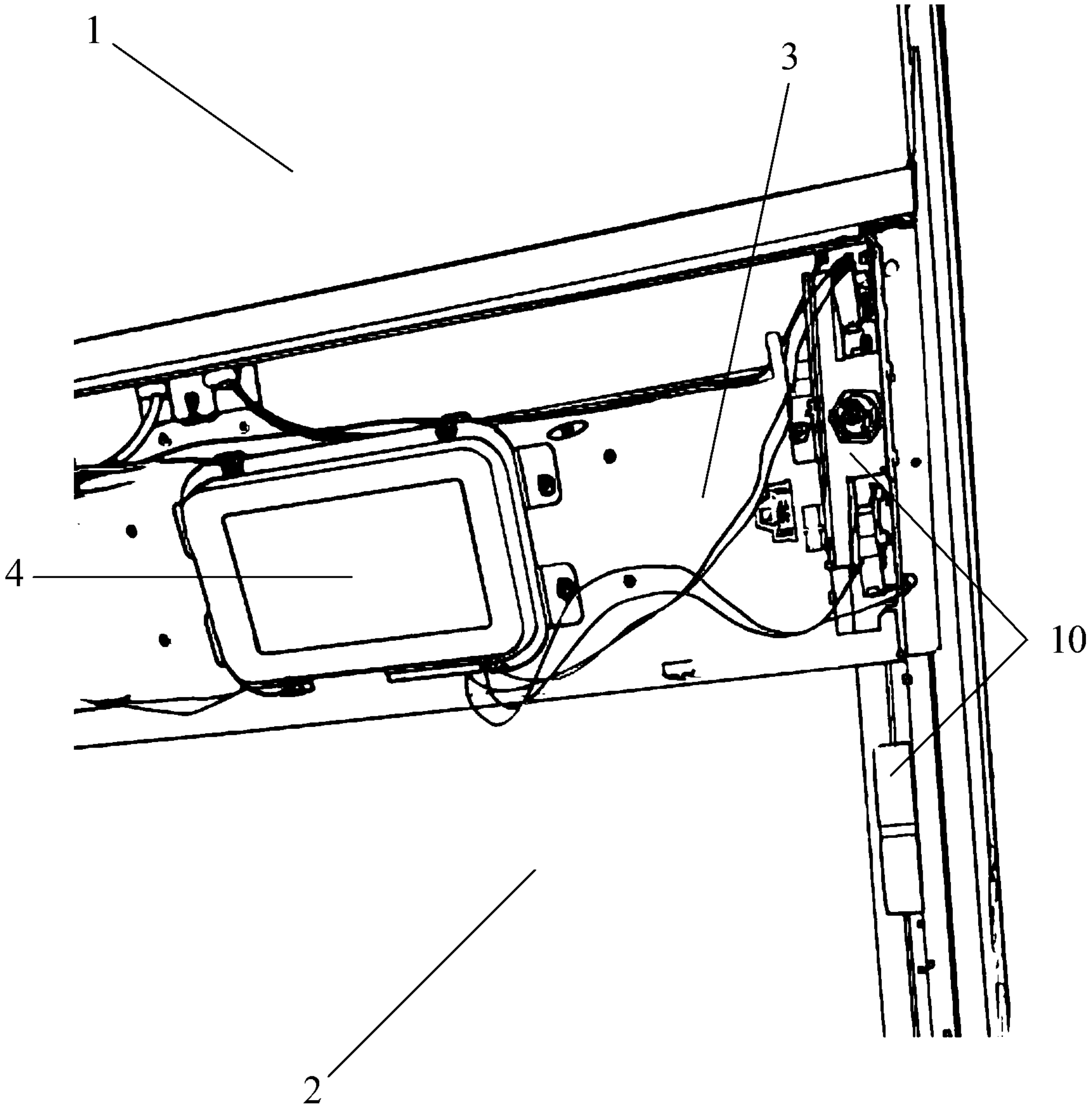
FIG. 2 shows a view of a part of a biological safety cabinet with a feedback mechanism in accordance with an embodiment of the present invention.

FIGS. 1 and 2 show a view of a biological safety cabinet 1 mounted with a feedback mechanism according to the present invention. The biological safety cabinet 1 comprises a movable glass window 2 and a cover plate 3 located on the front of at least a part of the glass window 2. The decorative bar of the cover plate is removed in FIG. 2. As shown, the biological safety cabinet is equipped with a feedback mechanism 10, and the feedback mechanism comprises a monitor control component and a contact component. Hereinafter, the monitor control component and the contact component of the embodiment of the present invention will be described in detail with reference to FIGS. 3-5.

Figure 3:
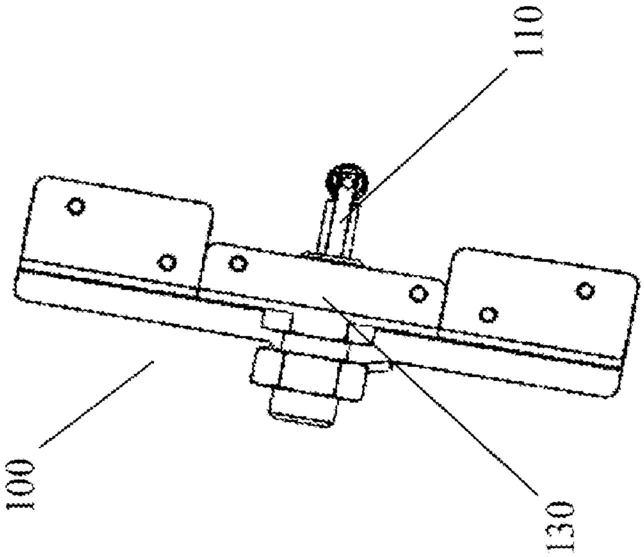
FIG. 3 shows a schematic of a monitor control component of a feedback mechanism in accordance with an embodiment of the present invention.

FIG. 3 shows in detail the monitor control component 100 of the feedback mechanism according to an embodiment of the present invention. The monitor control component comprises a roller element 110 and optionally a frame 130. The roller element 110 can be fixedly disposed relative to the cover plate 3, preferably on the side of the cover plate 3; alternatively, the roller element 110 can be fixed on the frame 130, and the frame 130 can be fixed relative to the cover plate 3 for example by screw connection.

Figure 4:
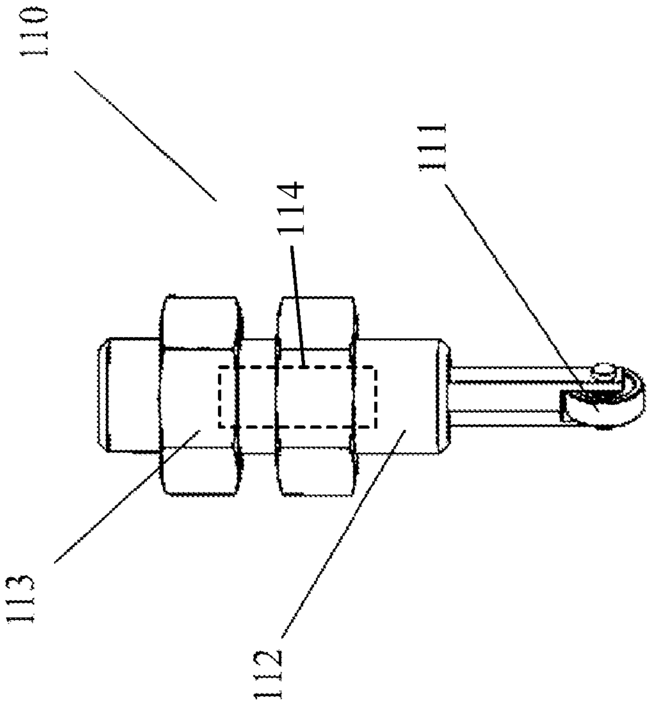
FIG. 4 shows a schematic of the roller element of the monitor control component of FIG. 3.

Referring to FIG. 4, the roller element 110 comprises a rollable roller 111 and a roller bearing portion 112, and the roller element 110 is positioned such that the roller 111 thereof faces the glass window 2 from the cover 3. Further, the roller element 110 further comprises a spring 114 disposed in the roller bearing portion 112 and connected to the roller 111, so that when the roller 111 is under pressure (for example, as described below, the pressure generated by contact with a contact component), the spring is compressed, and when the pressure of the roller 111 disappears, the spring is released, thereby allowing the roller 111 to roll on a non-planar surface.

The above spring-driven roller element 110 further comprises a nut 113 configured to rotatably adjust the spring to change the strength of the tactile feedback.

Figure 5:
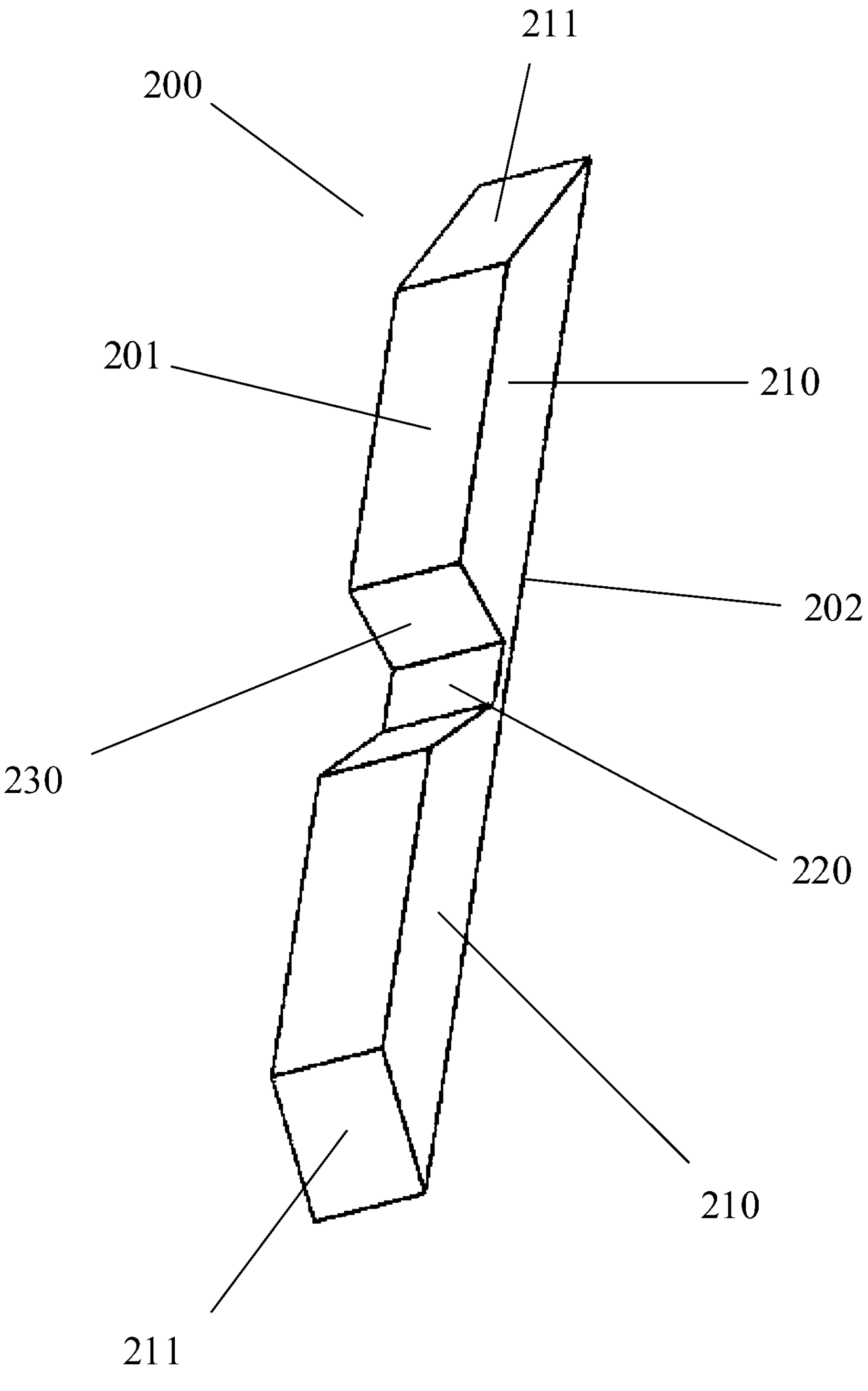
FIG. 5 shows a schematic of a contact component of a feedback mechanism in accordance with an embodiment of the present invention.

FIG. 5 shows a contact component 200 according to the feedback mechanism 10, which is fixedly disposed with respect to the glass window 2, preferably on one side of the glass window, so that the contact component 200 can move along with the movement of the glass window 2, thereby moving with respect to the roller 111 of the roller element 110 of the monitor control component 100.

Referring to FIG. 2, it should be noted that although the roller element of the monitor control component is preferably disposed on one side of the cover plate, and correspondingly, the contact component is disposed on one side of the glass window, so that the contact component can move relative to the roller, those skilled in the art can adopt other methods to achieve this goal, for example by disposing the roller element of the monitor control component on a surface of the cover plate facing the glass window, and disposing the contact component on a surface of the glass window facing the cover plate.

Referring back to FIG. 5, the contact component 200 comprises a top surface 201 and a bottom surface 202 opposite to the top surface 201 and formed with raised portions 210 for applying pressure to the roller 111 and a recess 220 for receiving the roller. The shape of the raised portions 210 and the recess 220 are designed together as two isosceles trapezoids. Particularly, as shown, the raised portions 210 have edge inclined surfaces 211 angled with respect to the bottom surface 202 of the contact component 200, the top surface 201 (i.e., the top surface 201 of the contact component 200), and side inclined surfaces 230 angled with respect to the bottom surface 202 along the direction of movement of the contact component 200, and the recess is defined by the inclined side 230. When the user pushes the glass window up or pulls the glass window from down, the raised portions 210 and the recess 220 are allowed to contact the roller one after another, but this is only an example, and other suitable shapes of the contact component can be adopted, as long as the roller 111 passes the raised portion and enters the recess when the glass window reaches the working position. In addition, in the present invention, the recess 220 of the contact component 200 is centrally positioned in the middle of the contact component 200, and wherein the roller element 110 is correspondingly centrally disposed on the middle portion of the frame 130, but this is also by way of example and not by limitation.

When the glass window 2 of the biological safety cabinet 1 does not enter the working position, the contact component 200 does not contact the roller 111 of the roller element 110 of the monitor control component 100.

When the user is pushing or pulling the glass window 2 to move the glass window relative to the cover plate 3, the glass window 2 moves to a position corresponding to the roller 111, so that the roller 111 first follows the raised portion 210 of the contact component 200 and receives pressure from the raised portion 210, thereby compressing the spring, and the frictional force increases accordingly.

When the glass window 2 of the biological safety cabinet 1 enters the working position, the roller 111 rolls into the recess 220 and releases the pressure, resulting in a sudden reduction in friction, so that the tactile feedback generated by the feedback mechanism reminds the user that the glass window 2 has reached the working position.

Tactile feedback has been achieved through the feedback mechanism 10 comprising the monitor control component 100 and the contact component 200 with a recess as. However, in the actual verification process, it was found that the roller of the monitor control component 100 would get stuck in the groove of the slider, causing the glass window to be unable to move out of the working position. By adjusting the intensity of the tactile mechanism, although the roller can be removed from the recess of the contact component, the tactile sensation of the glass window will become less obvious when it reaches the working position. So the user needs a balance that ensures a clear tactile feedback when the user moves the glass window to the working position, but also the ability to move the window out of the working position easily.

According to another embodiment of the invention, the feedback mechanism comprises a monitor control component 100 and a multi-angle contact component 300. Similar to the monitor control component shown in FIG. 3, the monitor control component 100 comprises a roller element 110 and optionally a frame 130, so that the relevant similar components are not described, and the contact component 300 is described in detail below.

Figure 7:
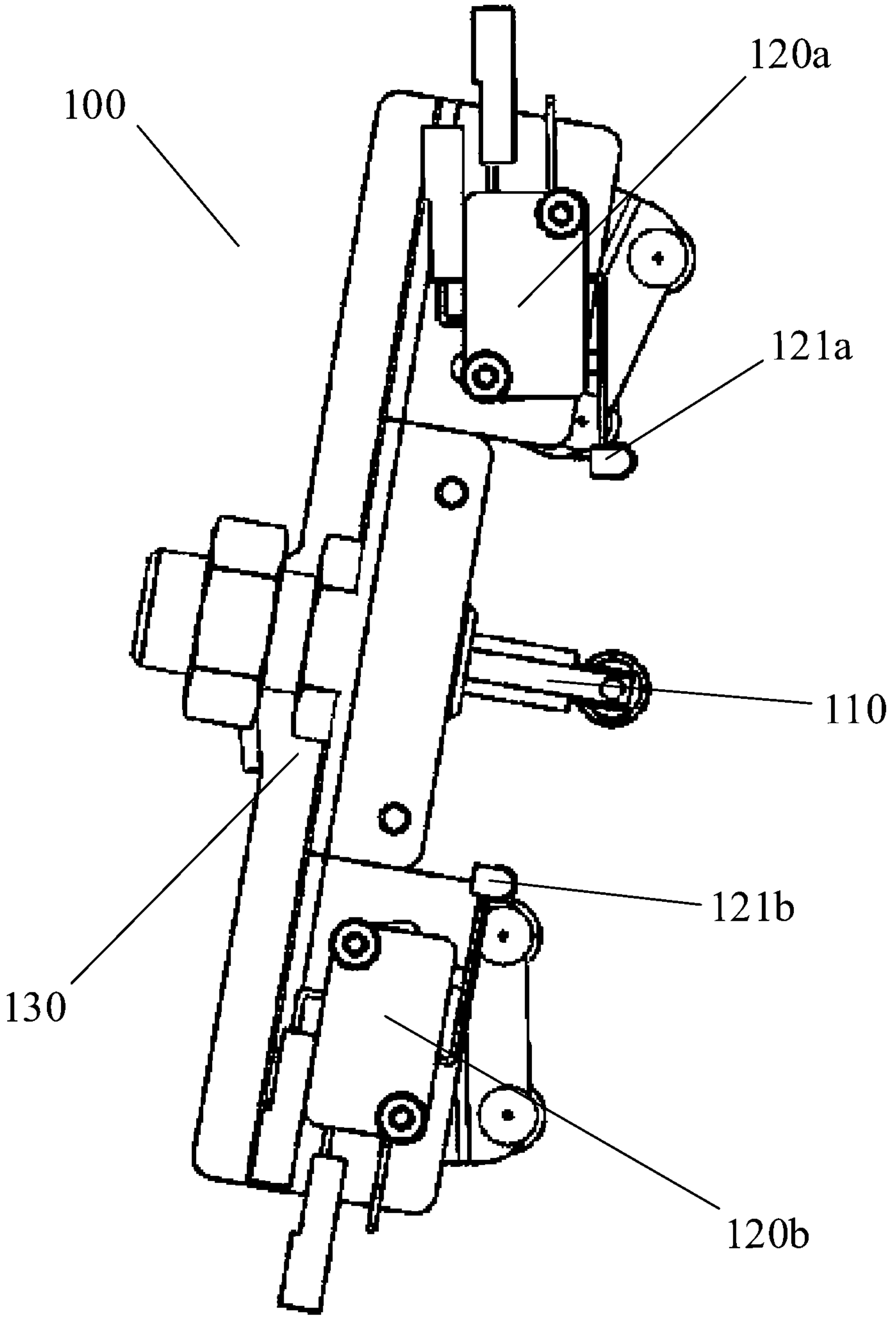
FIG. 7 shows a schematic of a monitor control component of a feedback mechanism in accordance with a further embodiment of the present invention.

FIG. 7 shows a plan view of such a multi-angle contact component 300. The contact component 300 has a top surface 301 and a bottom surface 302 opposite to the top surface 301, an edge inclined surface 311 angled at an angle C with respect to the bottom surface 302 of the contact component 300 along the direction of movement of the contact component 300, and a recess 320 which is recessed from the top surface 301 to form opposite side inclined surfaces 330, each of the side inclined surfaces comprising a first inclined surface 331 near the top surface 301 and a second inclined surface 332 continuous with the first inclined surface 331 and close to the bottom surface, and the roller 111 rolls into and out of the recess 320 along the first inclined surface 331 and the second inclined surface 332.

In this embodiment, an inclination angle A of the first inclined surface 331 with respect to the bottom surface 302 of the contact component 300 is smaller than an inclination angle B of the second inclined surface 332 with respect to the bottom surface 302, so that the different angles of the inclined surfaces can be used to facilitate moving the glass window while maintaining a distinct tactile feedback. Preferably, the inclination angle A of the first inclined surface 331 satisfies $15° \leq A < 35°$, and the inclination angle B of the second inclined surface 332 satisfies $35° \leq B < 45°$. Further preferably, the inclination angle C of the edge inclined surface 211 with respect to the bottom surface 302 satisfies $10° \leq C \leq 30°$.

The preferred inclination angle can be briefly illustrated by referring to the following tests.

In the recess 220 (see FIG. 5), the inclination angle of the side inclined surface in relation to the tension force is shown in Table 1.

TABLE 1

| item | status | Not touching the top surface | 30° | top surface | 45° | Maximum force | 45° change force |
|---|---|---|---|---|---|---|---|
| 1 | Push | 69N | 91N | 70N | 115N | 115N | 46N |
| | pull | 41N | 76N | 42N | 190N | 190N | 149N |

It can be found that when the angle is at 45°, the force value reaches 190 N when pulling the glass, while according to Table 1-10-14 of the mechanical design manual, the approximate value of the static force when the forearm is bent is 150 N. Therefore, this can result in not being able to pull the glass.

On the other hand, in the recess 320 (see FIG. 6), with angle A=30°, angle B=40°, and angle C=20°, for example, the relationship between the inclination angle A of the inclined surface 221 and the tension force is shown in Table 2.

TABLE 2

| item | status | Not touching the top surface | C = 20° | top surface | B = 45° | A = 30° | Maximum force | 45° change force |
|---|---|---|---|---|---|---|---|---|
| 1 | Push | 68.5N | 85N | 73N | 95N | 94N | 95N | 26.5N |
| | pull | 41N | 67N | 50N | 88N | 87.8N | 88N | 47N |
| 2 | Push | 64.7N | 84.4N | 67N | 100.4N | 97.5N | 100.4N | 35.7N |
| | pull | 39N | 67.5N | 44.2N | 90.7N | 90N | 90.7N | 51.7N |
| 3 | Push | 66.6N | 82.1N | 71.6N | 94.3N | 93.5N | 94.3N | 27.7N |
| | pull | 37.8N | 70N | 47N | 90N | 89N | 90N | 52.2N |
| 4 | Push | 6/N | 78.6N | 70.8N | 94.8N | 94.8N | 94.8N | 26.8N |
| | pull | 38.8N | 73N | 52.3N | 91N | 90.5N | 91N | 52.2N |

Analysis of the above four groups of data can be obtained that the maximum value of each group of data are not more than 150 N, so the glass window is able to be pulled at this time.

On the other hand, tactile sensation is generated by force changes in different stages. The 40° Angle position of the recess of the contact component is expected to generate the obvious tactile feedback to the users. It can be seen from the data in the table that the force value changes the most at this point. And the amount of change is relatively larger, then the tactile feeling is more obvious to users.

Figure 6:
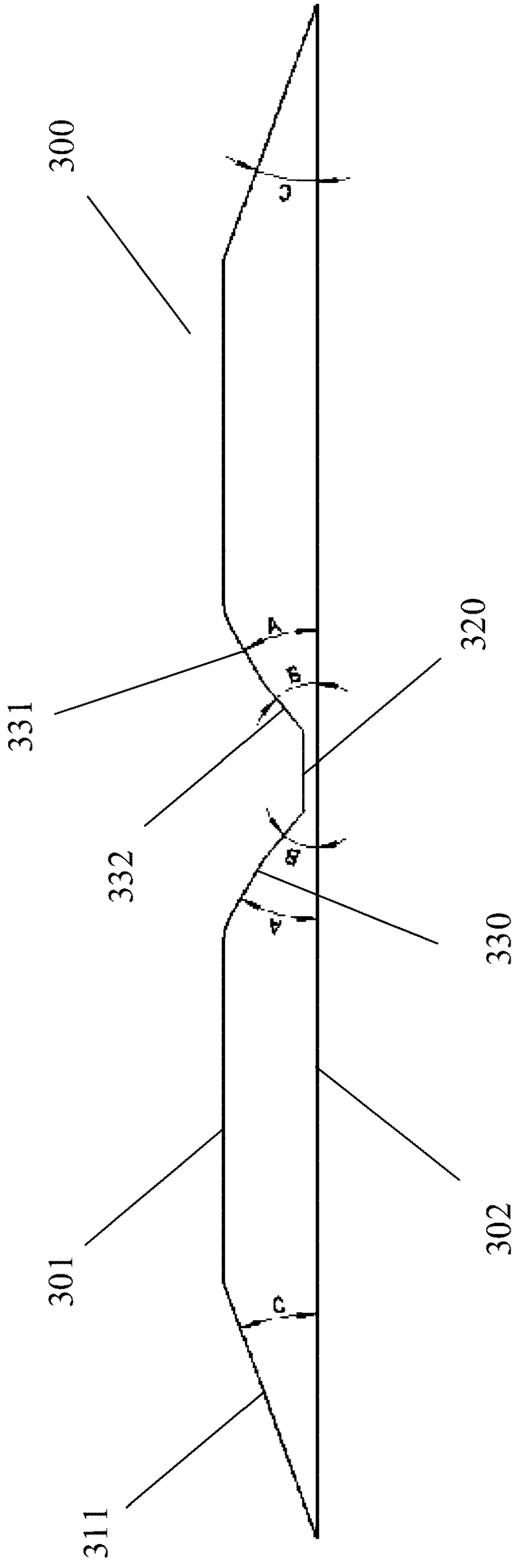
FIG. 6 shows a schematic of a contact component of a feedback mechanism in accordance with another embodiment of the present invention.

With continued reference to FIG. 6, in this embodiment, the intersection of the first inclined surface 331 and the second inclined surface 332 is located at a substantially middle position of the side inclined surface 330. The middle position is the midpoint of the travel when the rollers move on the side inclined surface 330. That is, the first inclined surface 331 and the second inclined surface 332 have equal lengths. Further, the substantially middle position means that the length difference between the first inclined surface 331 and the second inclined surface 332 is ±10%. This design allows both the first inclined surface 331 and the second inclined surface 332 to have a certain length that adequately serves to both make the glass window move smoothly and maintain a distinct tactile feedback. It will be appreciated that the first inclined surface 331 and the second inclined surface 332 may have other lengths such that the intersection of the first inclined surface 331 and the second inclined surface 332 is at other locations.

It should be understood that although in this embodiment, the side inclined surfaces 330 of the recess 320 of the contact component 300 is shown as having a first inclined surface 331 and a second inclined surface 332, in other embodiments, the recess of the contact component may have three or more inclined surfaces, and in additional embodiments, the concave portion may have a curved surface to improve movement of the glass and to ensure tactile feedback.

As shown in FIG. 7, according to another embodiment of the present invention, the feedback mechanism comprises a monitor control component 100 and a contact component 200. Similar to that shown in FIG. 3, the monitor control component 100 comprises a roller element 110 and an optional frame 130. Related similar components are not described in detail below.

As shown, the monitor control component 100 further comprises at least a first micro switch 120*a* and a second micro switch 120*b* fixedly disposed with respect to the cover plate 3 and respectively located on upper and lower sides of the roller element along the moving direction of the glass window relative to the cover plate 3, and spaced apart from each other by a distance of the recess 220 of the contact component 200.

The first micro switch 120*a* and the second micro switch 120*b* are configured to contact the contact component when the roller rolls into the recess, thereby generating a first trigger signal and a second trigger signal. Particularly, the first micro switch 120*a* and the second micro switch 120*b* respectively include movable arms 121*a* and 121*b*. When the roller 111 rolls into the recess 220, those movable arms are in contact with the contact component 200, thereby being pressed to generate the first trigger signal and the second trigger signal for feedback of the position of the roller relative to the recess. Those trigger signals are digital feedback, which can be fed back to the user via the human-machine interface 4 (FIG. 1). For example, the micro switches 120*a* and 120*b* can be connected to the human-machine interface 4 via wires, so that the user can see the digital feedback of the micro switches from the human-machine interface 4.

Similarly, optionally the roller element 110 and the first and second micro switch 120*a* and 120*b* are respectively fixedly disposed with respect to the cover plate 3; or the monitor control component comprises a frame 130, so that the roller element 110 and the first and second micro switch 120*a* and 120*b* are fixed on the frame 130, and the frame 130 is fixedly disposed with respect to the cover plate 3.

Figure 8:
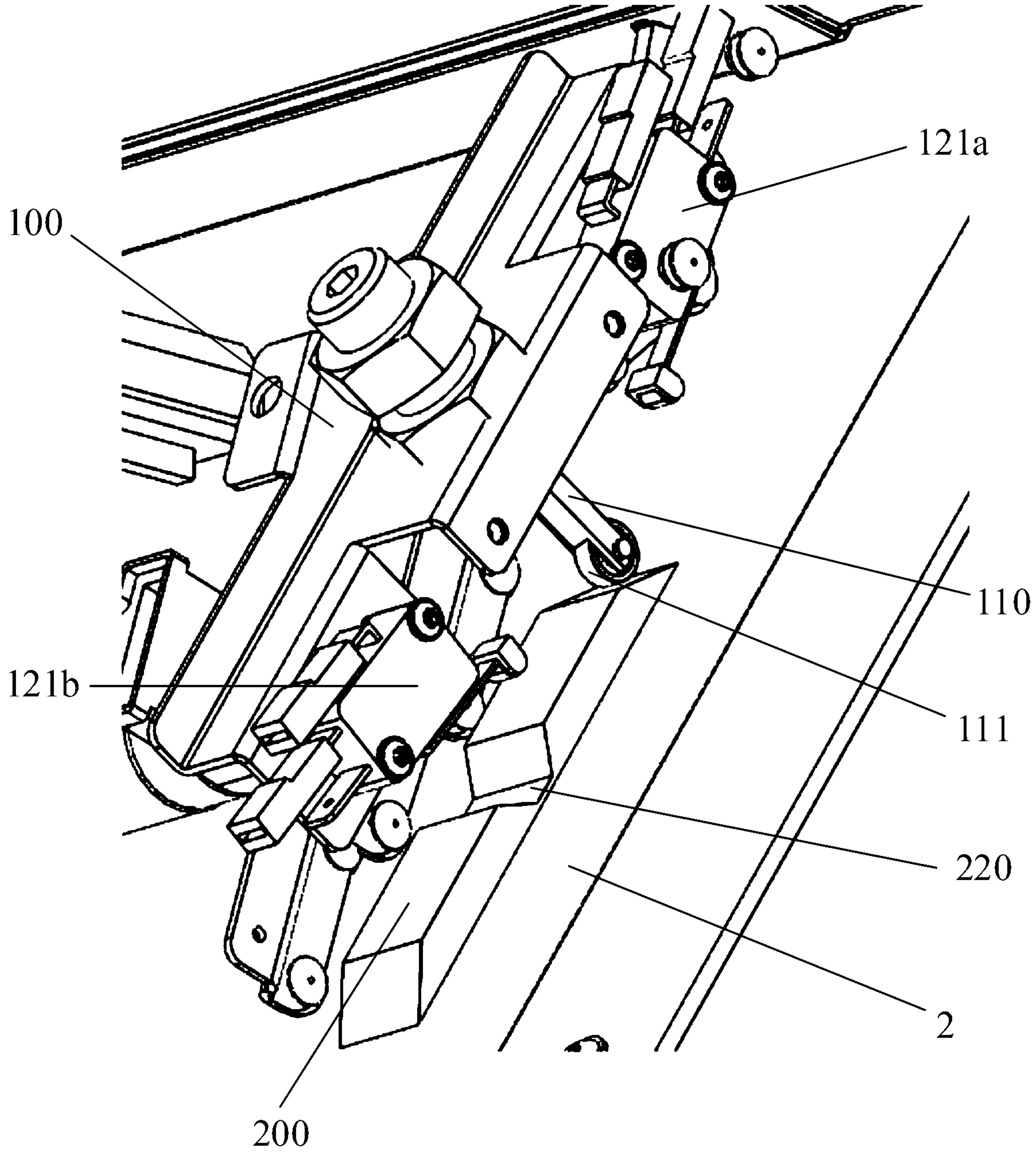
FIG. 8 shows a perspective view of the position of the feedback mechanism in accordance with a further embodiment of the present invention when the glass window of the biological safety cabinet does not reach the working position.
Figure 9:
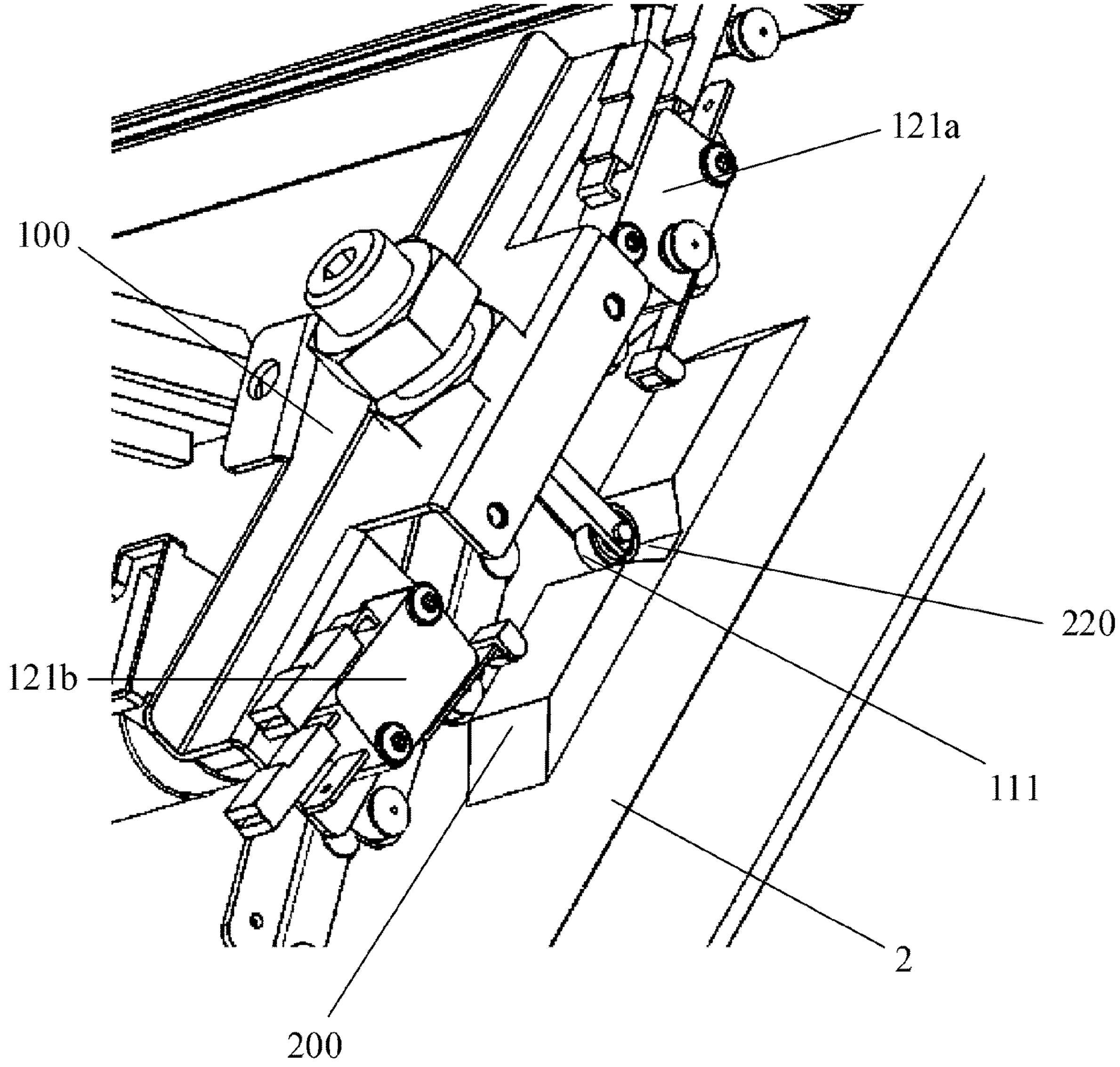
FIG. 9 shows a perspective view of the position of the feedback mechanism in accordance with a further embodiment of the present invention when the glass window of the biological safety cabinet reaches the working position.

FIGS. 8 and 9 respectively show a perspective view of the relative position of the monitor control component 100 and the contact component 200 of the feedback mechanism 10 when the glass window of the biological safety cabinet does not enter the working position and when it enters the working position according to another embodiment of the present invention. As shown in FIG. 8, when the user is moving the glass window 2 toward the working position, the contact component 200 moves with the glass window 2 to a position corresponding to the roller 111, so that the roller 111 first follows the raised portion 210 of the contact component 200 and receives pressure from the raised portion 210, and the friction force increases accordingly. Note that the arm of the first micro switch 120*a* or the arm of the second micro switch 120*b* may have contacted the protrusion 210 before the roller 111, and is pressed, thereby generating a trigger signal, but at this time the other one of the switches 120*a* and 120*b* does not generate a trigger signal, so the user can determine that the glass window has not reached the working position.

As shown in FIG. 9, when the glass window 2 enters the working position, the roller 111 rolls into the recess 220 and releases the pressure, causing a sudden reduction in friction and thus generating tactile feedback. At the same time, both the first micro switch 120*a* and the second micro switch 120*b* contact the raised portions, and both generate digital feedback, so that the user can determine that the glass window 2 has reached the working position by both tactile feedback and digital feedback generated by the feedback mechanism.

Although the structure of the present invention is illustrated above in conjunction with preferred embodiments, it should be recognized by those of ordinary skill in the art that the above examples are for illustrative purposes only and are not to be taken as a limitation of the present invention. Accordingly, modifications and variations of the present invention may be made, and these modifications and variations will fall within the scope defined by the claims appended to this application.

The invention claimed is:

1. A feedback mechanism for a biological safety cabinet, the biological safety cabinet comprising a movable glass window and a cover plate disposed in front of at least a portion of the glass window, the feedback mechanism comprising:

a monitor control component comprising a roller element being fixedly disposed with respect to the cover plate and comprising a rollable roller; and a contact component being fixedly disposed relative to the glass window so that the contact component can move relative to the roller with movement of the glass window, the contact component comprising a recess for receiving the roller, wherein the contact component moves with the glass window to a position corresponding to the roller when the glass window moves relative to the cover plate, such that the roller rolls into the recess, allowing the feedback mechanism to generate tactile feedback, and wherein the monitor control component further comprises at least a first micro switch and a second micro switch fixedly disposed with respect to the cover plate and spaced apart from each other along a moving direction of the glass window, and wherein the first micro switch and the second micro switch are configured to contact the contact component simultaneously when the roller rolls into the recess, thereby generating a first trigger signal and a second trigger signal being used to provide feedback of a position of the roller with respect to the recess.

2. The feedback mechanism for the biological safety cabinet according to claim 1, wherein the roller element of the monitor control component is disposed on a side of the cover plate and the contact component is correspondingly disposed on a side of the glass window.

3. The feedback mechanism for the biological safety cabinet according to claim 1, wherein the roller element of the monitor control component is disposed on a surface of the cover plate facing the glass window, and the contact component is provided on a surface of the glass window facing the cover plate.

4. The feedback mechanism for the biological safety cabinet according to claim 1, wherein the monitor control component comprises a frame to which the roller element and the first micro switch and second micro switch are fixed.

5. The feedback mechanism for the biological safety cabinet according to claim 1, wherein the first micro switch and second micro switch are located on upper and lower sides of the roller element along a direction of movement of the glass window with respect to the cover plate.

6. The feedback mechanism for the biological safety cabinet according to claim 1, wherein the roller element is a spring-driven roller element further comprising a roller bearing portion and a spring disposed within the roller bearing portion.

7. The feedback mechanism for the biological safety cabinet according to claim 6, wherein the spring-driven roller element further comprises a nut configured to rotatably adjust the spring to change a strength of the tactile feedback.

8. The feedback mechanism for the biological safety cabinet according to claim 4, wherein the recess of the contact component is centrally positioned in a middle of the contact component, and wherein the roller element is centrally disposed on the middle portion of the frame.

9. The feedback mechanism for the biological safety cabinet according to claim 1, wherein the first micro switch and the second micro switch each comprises a movable arm, and the first micro switch and the second micro switch contacting the contact component comprises the movable arms of the first micro switch and the second micro switch being pressed by the contact component to generate the first trigger signal and the second trigger signal.

10. The feedback mechanism for the biological safety cabinet according to claim 1, wherein the contact component comprises a top surface and a bottom surface opposite to the top surface, the recess being recessed from the top surface to form opposite side inclined surfaces, and each of the side inclined surfaces comprising a first inclined surface close to the top surface and a second inclined surface continuous with the first inclined surface and close to the bottom surface, and wherein a first inclination angle of the first inclined surface relative to the bottom surface of the contact component is smaller than a second inclination angle of the second inclined surface relative to the bottom surface of the contact component.

11. The feedback mechanism for the biological safety cabinet according to claim 10, wherein the first inclination angle is greater than or equal to 15° and less than 35°, and the second inclination angle is greater than or equal to 35° and less than 45°.

12. The feedback mechanism for the biological safety cabinet according to claim 10, wherein an intersection of the first inclined surface and the second inclined surface is at a substantially middle position of the side inclined surface.

13. The feedback mechanism for the biological safety cabinet according to claim 1, wherein the contact component further comprises edge inclined surfaces angled with a bottom surface of the contact component along a direction of movement of the contact component, and a third inclination angle of the edge inclined surfaces relative to the bottom surface of the contact component is 10° to 30°.

14. A biological safety cabinet comprising the feedback mechanism for the biological safety cabinet according to claim 1.

* * * * *